United States Patent
Fendt

(10) Patent No.: US 11,039,078 B2
(45) Date of Patent: Jun. 15, 2021

(54) METHOD AND DEVICE FOR PREDICTABLE EXPOSURE CONTROL OF AT LEAST ONE FIRST VEHICLE CAMERA

(71) Applicant: Conti Temic microelectronic GmbH, Nuremberg (DE)

(72) Inventor: Guenter Anton Fendt, Schrobenhausen (DE)

(73) Assignee: Conti Ternie microelectronic GmbH, Nuremberg (DE)

( * ) Notice: Subject to any disclaimer, the term of this patent is extended or adjusted under 35 U.S.C. 154(b) by 0 days.

(21) Appl. No.: 16/604,369

(22) PCT Filed: Aug. 7, 2018

(86) PCT No.: PCT/DE2018/200074
§ 371 (c)(1),
(2) Date: Oct. 10, 2019

(87) PCT Pub. No.: WO2019/042503
PCT Pub. Date: Mar. 7, 2019

(65) Prior Publication Data
US 2020/0128165 A1  Apr. 23, 2020

(30) Foreign Application Priority Data

Sep. 1, 2017 (DE) ...................... 10 2017 215 347.4

(51) Int. Cl.
*H04N 5/235* (2006.01)
*H04N 5/247* (2006.01)
(Continued)

(52) U.S. Cl.
CPC .......... *H04N 5/2353* (2013.01); *B60R 11/04* (2013.01); *H04N 5/2351* (2013.01); *H04N 5/247* (2013.01);
(Continued)

(58) Field of Classification Search
CPC . B60R 2300/302; H04N 5/2354; H04N 13/25
See application file for complete search history.

(56) References Cited

U.S. PATENT DOCUMENTS

| 7,557,857 B2 * | 7/2009 | Tsuda | H04N 5/238 |
| | | | 348/229.1 |
| 7,634,107 B2 * | 12/2009 | Fujii | G06K 9/00697 |
| | | | 382/103 |

(Continued)

FOREIGN PATENT DOCUMENTS

| DE | 102012025580 | 6/2014 |
| DE | 102015014263 | 5/2016 |
| EP | 1 763 229 | 3/2007 |

OTHER PUBLICATIONS

PCT, English translation of the International Search Report of the International Searching Authority for International Application PCT/DE2018/200074, dated Nov. 7, 2018, 3 pages, European Patent Office, HV Rijswijk, Netherlands.

(Continued)

*Primary Examiner* — Brian P Yenke
(74) *Attorney, Agent, or Firm* — W. F. Fasse

(57) ABSTRACT

In a device for predictable exposure control of a vehicle camera, a first vehicle camera has a visual field directed to the side or to the rear, and a second vehicle camera has a visual field directed to the front. A method involves recording second image data from the outer front surroundings by the second vehicle camera, detecting a region having altered brightness within the second image data, determining a required change of an exposure value based on the second image data, to compensate for a brightening or darkening that occurs when the vehicle enters the region having altered brightness, and transmitting the changed exposure value to the first vehicle camera such that, upon entry into the region (Continued)

having altered brightness, the first vehicle camera records first image data based on the changed exposure value.

10 Claims, 2 Drawing Sheets

(51) Int. Cl.
  *B60R 11/04* (2006.01)
  *B60R 11/00* (2006.01)
(52) U.S. Cl.
  CPC . *B60R 2011/004* (2013.01); *B60R 2011/0026* (2013.01)

(56) References Cited

U.S. PATENT DOCUMENTS

| | | | | |
|---|---|---|---|---|
| 7,839,272 | B2* | 11/2010 | Saito | B60R 1/00 340/425.5 |
| 7,957,559 | B2* | 6/2011 | Shima | G06K 9/00798 348/113 |
| 9,001,210 | B2* | 4/2015 | Tanaka | G08G 1/04 348/159 |
| 9,294,681 | B2* | 3/2016 | Murao | G06K 9/2054 |
| 9,524,438 | B2* | 12/2016 | Wedajo | G06K 9/00791 |
| 9,641,807 | B2* | 5/2017 | Schuder | H04N 7/18 |
| 9,787,910 | B2* | 10/2017 | Kristensen | B60W 30/00 |
| 9,802,538 | B2* | 10/2017 | Augst | B60R 1/00 |
| 10,154,200 | B2* | 12/2018 | Rycenga | G03B 7/097 |
| 10,552,688 | B2* | 2/2020 | Faber | G06K 9/00825 |
| 10,582,131 | B2* | 3/2020 | Nakayama | G06K 9/00825 |
| 10,705,207 | B2* | 7/2020 | Grewe | G01S 13/867 |
| 2005/0220450 | A1* | 10/2005 | Enomoto | G01S 17/89 396/104 |
| 2006/0269271 | A1* | 11/2006 | Kokel | H04N 5/2353 396/213 |
| 2007/0285282 | A1 | 12/2007 | Nakayama et al. | |
| 2008/0013789 | A1 | 1/2008 | Shima et al. | |
| 2008/0309517 | A1* | 12/2008 | Saito | B60R 1/00 340/937 |
| 2009/0080794 | A1* | 3/2009 | Amano | G06T 5/009 382/274 |
| 2009/0201361 | A1* | 8/2009 | Lyon | H04N 5/23203 348/36 |
| 2009/0251563 | A1* | 10/2009 | Mochida | G03B 7/08 348/229.1 |
| 2010/0045797 | A1* | 2/2010 | Schofield | G06K 9/00825 348/148 |
| 2012/0002050 | A1* | 1/2012 | Taniguchi | G08G 1/167 348/148 |
| 2012/0162424 | A1 | 6/2012 | Murao et al. | |
| 2014/0098997 | A1* | 4/2014 | Faber | G06K 9/00791 382/103 |
| 2016/0112624 | A1* | 4/2016 | Kroekel | H04N 21/41422 348/148 |
| 2016/0173749 | A1* | 6/2016 | Dallas | H04N 5/2352 348/208.6 |
| 2016/0205283 | A1* | 7/2016 | Kim | G06K 9/4604 382/141 |
| 2017/0153326 | A1* | 6/2017 | Grewe | G01S 13/86 |
| 2017/0310952 | A1* | 10/2017 | Adomat | H04N 5/2353 |
| 2018/0139368 | A1* | 5/2018 | Nakayama | G06K 9/00825 |
| 2018/0334099 | A1* | 11/2018 | Gao | B60Q 1/2603 |
| 2019/0034752 | A1* | 1/2019 | Lang | G06K 9/46 |
| 2019/0193633 | A1* | 6/2019 | Ichikawa | G06K 9/00825 |
| 2019/0208111 | A1* | 7/2019 | Wendel | H04N 5/243 |
| 2019/0281235 | A1* | 9/2019 | Breuer | H04N 7/0155 |
| 2019/0327415 | A1* | 10/2019 | Prabhakar | H04N 5/23293 |
| 2020/0077031 | A1* | 3/2020 | Lee | H04M 1/02 |
| 2020/0162652 | A1* | 5/2020 | Nakayama | B60Q 9/00 |
| 2020/0169689 | A1* | 5/2020 | Hirooka | H04N 5/247 |
| 2020/0282921 | A1* | 9/2020 | Herman | H04N 5/374 |
| 2021/0029290 | A1* | 1/2021 | Oku ike | G06K 9/4652 |

OTHER PUBLICATIONS

PCT, PCT International Preliminary Report on Patentability including English Translation of PCT Written Opinion of the International Searching Authority for International Application PCT/DE2018/200074, dated Mar. 3, 2020, 7 pages, International Bureau of WIPO, Geneva, Switzerland.

German, German Search Report for German Patent Application No. 10 2017 215 347.4, dated Mar. 7, 2018, 9 pages, German Patent and Trademark Office, Muenchen, Germany, with partial English translation, 7 pages.

* cited by examiner

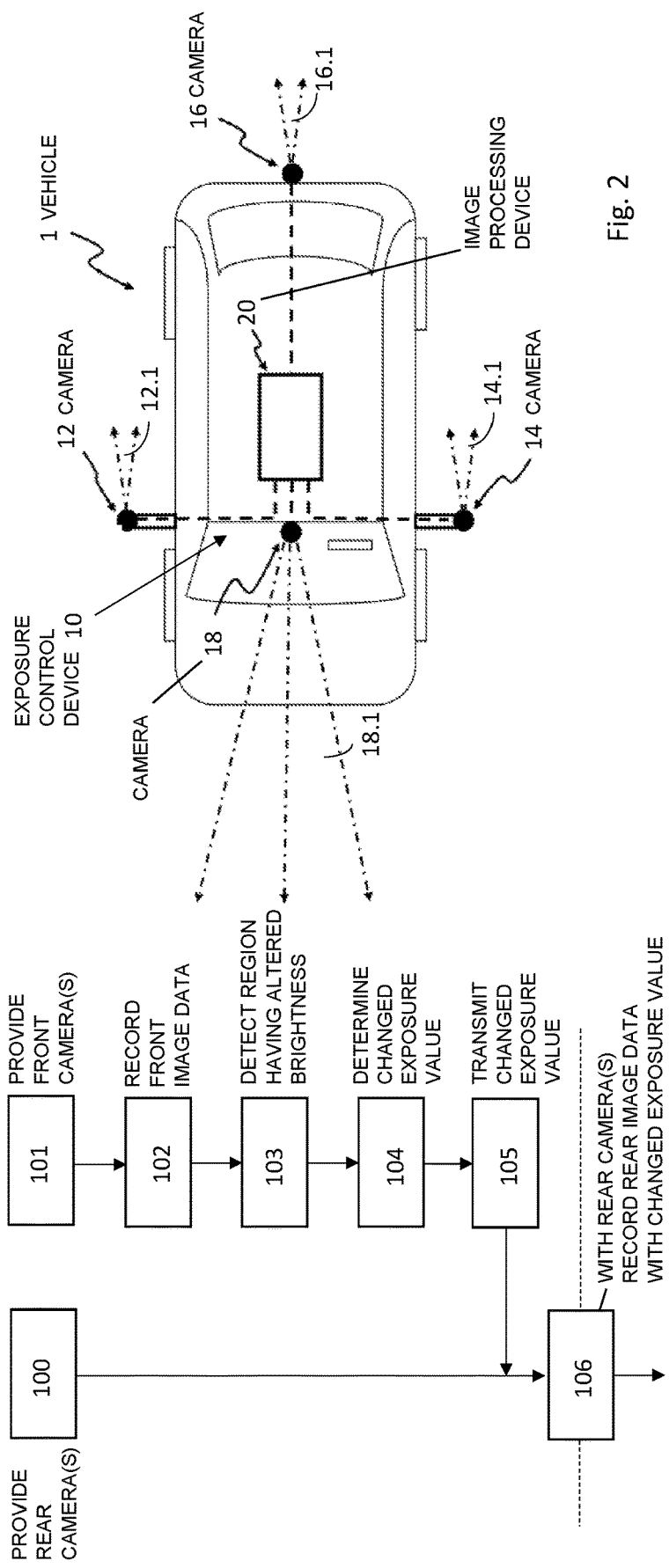

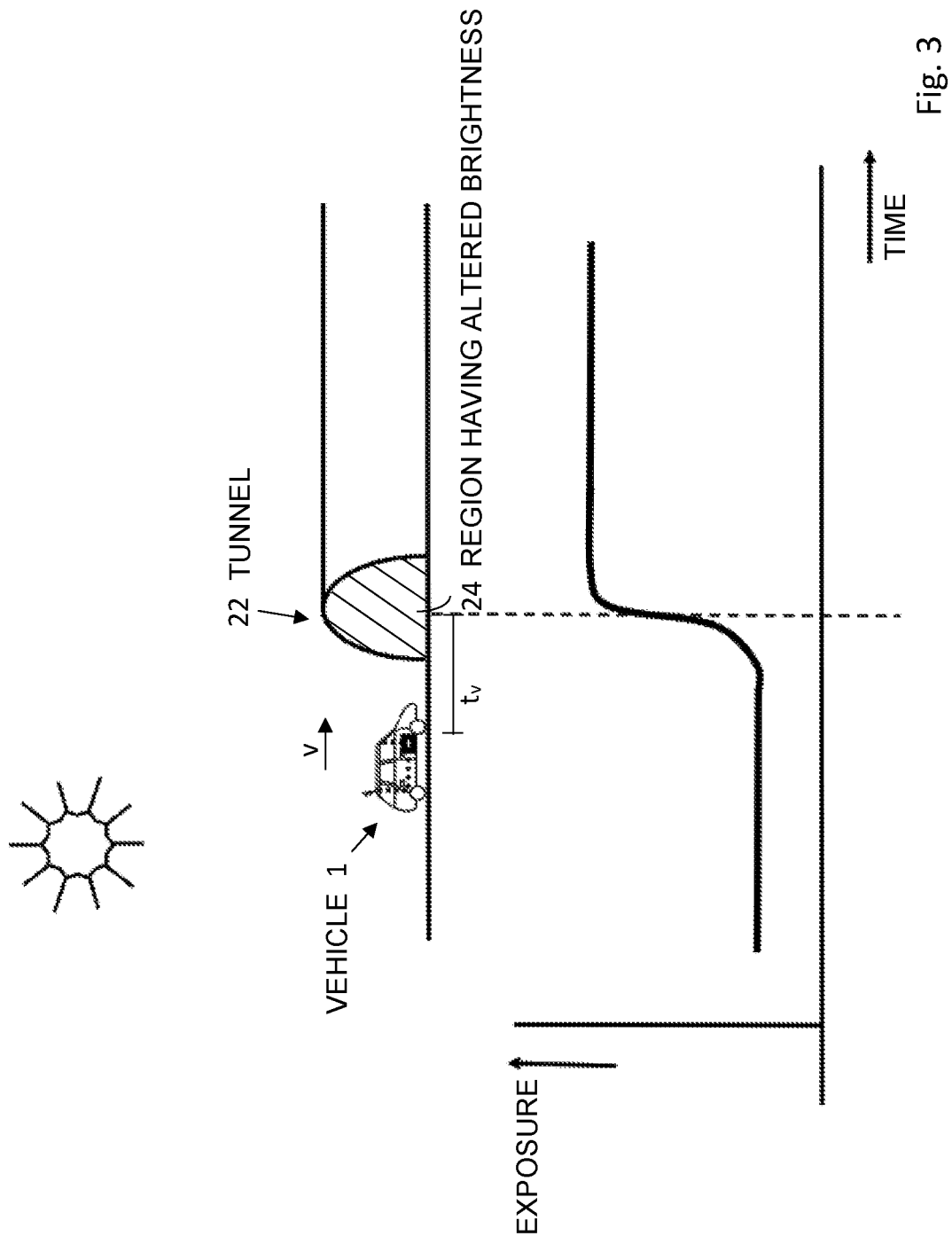

METHOD AND DEVICE FOR PREDICTABLE EXPOSURE CONTROL OF AT LEAST ONE FIRST VEHICLE CAMERA

FIELD OF THE INVENTION

The invention relates to a method for predictable exposure control of at least one first vehicle camera. The invention further relates to a device for predictable exposure control of at least one first vehicle camera, and a vehicle having such a device.

BACKGROUND INFORMATION

Image capturing devices, for example cameras, feature prominently in driver assistance systems. The image capturing devices serve to capture the vehicle surroundings and, based on the captured image data, the different driver assistance functions can then be performed. Current image capturing devices adapt their exposure time to the brightness conditions of the surroundings, in order to avoid an overexposure or underexposure. This is particularly performed to the effect that a currently recorded image or the captured image data is/are evaluated and, depending on whether the image or the image data is/are too light or too dark, the next image or the image data is/are exposed differently, particularly for a shorter or longer period. This results in a temporal displacement. If the brightness conditions suddenly change because the vehicle has passed through a transition from dark to light surroundings or vice versa, for example when driving into or when driving out of a tunnel, it will take some time for the camera to adapt the exposure time to the new or modified surroundings. As a result, the camera is virtually blind due to an overexposure or underexposure. During this situation the camera cannot supply any reliable image data of the vehicle surroundings, resulting in losses of functionality and, thus, considerable safety deficits when used in driver assistance systems.

SUMMARY OF THE INVENTION

The object which consequently forms the basis of the invention is to indicate a solution for the aforementioned problem.

The above object can be achieved by a method, a device, a vehicle and a computer program having the inventive features set forth herein.

According to a first aspect, the invention relates to a method for predictable exposure control of at least one first vehicle camera. The method comprises the following steps:
  providing at least one first vehicle camera, the visual field of which is substantially directed to the side or to the rear in order to capture a lateral, a lateral rear and/or a rear surrounding region of a vehicle,
  providing at least one second vehicle camera, the visual field of which is substantially directed to the front in order to capture an outer front surrounding region of the vehicle,
  recording second image data from the outer front surrounding region of the vehicle by means of the second vehicle camera,
  detecting a region having altered brightness within the second image data of the second vehicle camera,
  determining a required change of an exposure value, particularly based on the second image data, in order to compensate for a brightening or darkening which occurs when the vehicle enters the region having the altered brightness, and
  transmitting the changed exposure value to the at least one first vehicle camera, such that, upon entry into the region having altered brightness the at least one first vehicle camera can record first image data based on the changed exposure values.

Consequently, the advantage of the present invention particularly lies in the fact that, even in the case of a vehicle camera which substantially has a visual field which is not directed in the direction of travel of the vehicle, that is to say which does not point towards the future surrounding region, an exposure value, particularly an exposure time or an aperture setting, can be obtained, which harmonizes with the current or pending brightness condition. Temporal dropouts of the cameras can consequently be prevented. A blindness of the camera can consequently be avoided, as a result of which a very high reliability or stability can be guaranteed when the camera is used in driver assistance systems.

The at least second image data preferably contain the outer surroundings of the vehicle, in which the vehicle is potentially moving, ideally a region ahead of the vehicle. A region having altered brightness can be detected in the region ahead. In order to detect regions having altered brightness, known methods can be applied.

In the present case, altered brightness can mean both a darkening and a brightening. The brightness can consequently both decrease and increase, as a result of which, if the exposure value is not correctly adapted, an overexposure or underexposure can occur.

A required change of the exposure value can, in the present case, be particularly achieved by changing the exposure time and/or adapting the aperture.

First image data can preferably be recorded by means of the at least one first vehicle camera. Ideally, the at least one first vehicle camera records first image data at the point in time of the entry into the region having altered brightness, based on the transmitted changed exposure value. The changed exposure value transmitted by the second vehicle camera to the at least one first vehicle camera is preferably adjusted automatically.

The first vehicle cameras are particularly cameras of a camera-based mirror replacement system. Camera-based mirror replacement systems have a plurality of advantages compared with conventional side mirrors. On the one hand, the aerodynamics of the vehicle are improved. Camera-based mirror replacement systems have a lower air resistance. On the other hand, a weight saving can be attained by the camera-based mirror replacement systems. Overall, this produces a reduction in the fuel consumption.

A remaining period of time until the vehicle, particularly until the at least one first vehicle camera, will probably enter the region having altered brightness is preferably determined. In the present case, the term 'remaining period of time' particularly denotes an interval between the recording of second image data by means of the second vehicle camera, wherein a region having altered brightness is detected on the basis of the recorded second image data, and the entering of the at least one first vehicle camera into the region having altered brightness.

As a result, it is particularly achieved that at the exact time that the region having altered brightness is reached, the at least one first vehicle camera records an image or image data having the changed exposure value. The exposure of the at least one first vehicle camera is consequently adapted to the prevailing brightness of the surroundings. As a result, a real-time setting of the exposure value or of the exposure time of the vehicle camera directed to the rear is particularly made possible. The images of the vehicle camera directed to the rear are, as a consequence, ideally exposed at any point in time.

The remaining period of time particularly depends on the spacing of the vehicle from the region having altered brightness at the point in time the second image data are recorded, as well as on how the vehicle is moving along. Based on the calculated remaining time or on the remaining period of time and a reference time or particularly on a current time, a point in time when the vehicle will probably enter the region having altered brightness can be determined.

Movement values of the vehicle can preferably be established. Based on the movement values, the remaining period of time until the vehicle or the at least one first vehicle camera will probably enter the region having altered brightness is then determined. To this end, at least a current driving speed of the vehicle and/or at least a current steering lock or a steering angle of the vehicle can be enlisted. The data for this can preferably be provided by means of chassis sensors which are supplied, for example, with data regarding yaw, pitching and/or rolling movements of the vehicle. This type of calculation is particularly efficient since movement values are typically established anyway and can be utilized for the method according to the present invention without any additional outlay or at least with a particularly low additional outlay.

The fact that a road runs a hundred percent straight in very few cases means that it is advantageous if the course of the road or the course of the driving route, which the vehicle has to follow until it reaches the region having altered brightness, can be captured. The driving route can be captured by the second vehicle camera and corresponding (image) processing devices. The deployment of lane detection devices is additionally conceivable.

In a preferred configuration, the region having altered brightness can be scaled within multiple second image data recorded successively in time. To this end, the second image data from the outer surroundings of the vehicle are particularly recorded by means of the second vehicle camera. Based on the result of this scaling over time, the remaining period of time until the at least one first vehicle camera will probably enter the region having altered brightness is then determined.

The required change of the exposure value is preferably determined in that local differences in brightness between the detected region having altered brightness and the remaining regions of the second image data are established within the second image data.

According to a second aspect of the invention, a device for predictable exposure control of at least one first vehicle camera is provided. The device comprises at least one first vehicle camera, the visual field of which is substantially directed to the rear in order to capture a lateral, a lateral rear and/or a rear surrounding region of a vehicle, at least one second vehicle camera, the visual field of which is substantially directed to the front in order to capture a front surrounding region of the vehicle, and an image processing device, wherein the device is set up by means of the vehicle cameras and the image processing device to carry out the steps of a method according to the first aspect of the invention.

Consequently, the advantage of the present device lies particularly in the fact that even in the case of a camera which substantially has a visual field which is not directed in the direction of travel of a vehicle, that is to say which is not directed towards the future surroundings, an exposure value, particularly an exposure time or an aperture setting, can be obtained, which harmonizes with the current brightness condition. Temporal dropouts of the cameras can consequently be prevented.

The at least one first vehicle camera is preferably arranged in the lateral region of the vehicle. Ideally, two first vehicle cameras are provided, wherein a first vehicle camera is arranged on the right outer side of the vehicle and the second first vehicle camera is arranged on the left outer side of the vehicle. The at least one first vehicle camera is advantageously arranged in the region of a side mirror. The at least one first vehicle camera, preferably the at least two first vehicle cameras, is/are particularly cameras of a camera-based mirror replacement system.

However, it is also possible that the at least one first vehicle camera is arranged on a rear side of the vehicle. In this case, the first vehicle camera substantially captures a rear surrounding region of the vehicle.

The second vehicle camera can preferably be arranged in the interior of the vehicle, particularly in a region behind a windshield of the vehicle.

The vehicle cameras can also be part of a surround view system.

The device according to the invention is particularly suitable in driver assistance systems.

According to a third aspect of the invention, a vehicle is provided which comprises a device according to the second aspect of the invention. The vehicle is, for example, a motor vehicle such as a car, a bus or a truck. However, two-wheeled vehicles such as motorcycles as well as agricultural machines are also conceivable.

According to a fourth aspect of the invention, a programming element is provided which, if it is run on a processor, instructs the processor to carry out the method steps according to the first aspect of the invention, wherein particularly all of the method steps are carried out which are performed following the provision of the vehicle cameras which are arranged on the vehicle.

According to a fifth aspect of the invention, a computer-readable medium is provided on which a programming element is stored, which, if it is run on a processor, instructs the processor to carry out the method steps according to the first aspect of the invention, wherein all of the method steps which are performed following the provision of the vehicle cameras arranged on the vehicle are particularly carried out.

BRIEF DESCRIPTION OF THE DRAWINGS

In the following, the invention will be explained in greater detail, with reference to the appended figures.

FIG. 1 shows a flow diagram of a method according to an embodiment of the invention;

FIG. 2 shows a schematic top view of a vehicle according to an embodiment of the invention;

FIG. 3 shows a schematic representation of a vehicle according to a further embodiment of the invention within exemplary surroundings.

DETAILED DESCRIPTION OF EXAMPLE EMBODIMENTS OF THE INVENTION

FIG. 1 shows a flow diagram of a method according to an embodiment of the invention. The method is particularly used for predictable exposure control of at least one first vehicle camera 12, 14, 16.

In a step 100, at least one first vehicle camera 12, 14, 16 is provided. The visual field 12.1, 14.1, 16.1 of the vehicle camera 12, 14, 16 is substantially directed to the rear. As a result, the at least one first vehicle camera 12, 14, 16 can capture a lateral rear and/or a rear surrounding region of a vehicle 1.

The at least one first vehicle camera 12, 14, 16 can preferably be a camera of a camera-based mirror replacement system. First image data can preferably be recorded by means of the at least one first vehicle camera 12, 14, 16.

In a step 101, at least one second vehicle camera 18 is provided. The visual field 18.1 of the vehicle camera 18 is substantially directed to the front. As a result, the second vehicle camera 18 can capture an outer front surrounding region of the vehicle 1.

In a step 102, the second vehicle camera 18 records second image data from the outer front surrounding region of the vehicle 1.

In a step 103, a region having altered brightness 24 is detected within the second image data of the second vehicle camera 18. The region having altered brightness is represented in FIG. 3 by the hatched region 24.

In a step 104, a required change of an exposure value is particularly determined based on the second image data, in order to compensate for a brightening or darkening which occurs when the vehicle 1 enters the region having the altered brightness 24. The required change of the exposure value can be determined in that local differences in brightness between the detected region having altered brightness 24 and the remaining regions of the second image data are established within the second image data.

In a step 105, the changed exposure value is transmitted to the at least one first vehicle camera 12, 14, 16. It is particularly achieved by means of the transmission that the at least one first vehicle camera 12, 14, 16, on entering the region having altered brightness 24, can record first image data based on the changed exposure values, with this preferably being performed automatically. This is represented in step 106. The dashed line represented in FIG. 1 shows the entry into the region having altered brightness 24.

Consequently, the advantage of the present method lies particularly in the fact that in the case of a vehicle camera 12, 14, 16, which substantially has a visual field 12.1, 14.1, 16.1 which is not directed in the direction of travel of the vehicle 1, an exposure value can be obtained which harmonizes with the current or pending brightness condition.

FIG. 2 shows a schematic top view of a vehicle 1 having a device 10 according to an embodiment of the invention. The device 10 is particularly used for predictable exposure control of at least one first vehicle camera 12, 14, 16.

The device 10 comprises at least one first vehicle camera 12, 14, 16, wherein the visual field 12.1, 14.1, 16.1 of the at least one first vehicle camera 12, 14, 16 is, in each case, substantially directed to the rear. A first and a second first vehicle camera 12 and 14 capture a lateral rear surrounding region of the vehicle 1 and a third first vehicle camera 16 captures a rear surrounding region of the vehicle 1.

The at least one first vehicle camera 12, 14 is preferably arranged in the lateral region of the vehicle 1, wherein a first vehicle camera 12 is arranged on the right outer side of the vehicle 1 and a second first vehicle camera 14 is arranged on the left outer side of the vehicle 1. The at least two first vehicle cameras 12, 14 are particularly cameras of a camera-based mirror replacement system.

The third first camera 16 is preferably arranged on a rear side of the vehicle 1.

The device 10 additionally comprises at least one second vehicle camera 18. The visual field 18.1 is substantially directed to the front. As a result, the second vehicle camera 18 captures a front surrounding region of the vehicle 10. The second vehicle camera 18 can preferably be arranged in an interior of the vehicle 1, particularly in a region behind a windscreen of the vehicle 1.

Moreover, the device 10 comprises an image processing device 20. The image processing device 20 can preferably be software-implemented. It is conceivable that a software-implemented image processing device 20 is stored on a storage unit of one of the vehicle cameras.

The device 10 is set up to detect the region having altered brightness 24 within the second image data, e.g. by known methods which can be applied by the image processing device 20.

FIG. 3 shows a schematic representation of a vehicle 1 according to a further embodiment of the invention within exemplary surroundings, wherein this is particularly a time of day when the sun is positioned high in the sky. The vehicle 1 is moving in the direction of a tunnel 22. The tunnel 22 particularly constitutes a region having altered brightness 24. On driving into the tunnel 22 or on subsequently driving out of the tunnel 22, the vehicle 1 undergoes in each case a transition from light to dark surroundings or vice versa.

The vehicle 1 is driving, for example, at a speed v. The speed v can be established in the known way. For example, the image processing device 20 can calculate, by means of known image processing methods, a distance or a spacing between the tunnel 22 and the vehicle 1 at the current time. Based on the distance or the spacing and/or the movement of the vehicle 1, particularly the direction and the speed of the vehicle 1, a remaining period of time $t_v$ until the vehicle will probably enter the tunnel 22 or the region having altered brightness 24 can be calculated.

If a current time or a reference time is known, the point in time at which the vehicle 1 or the at least one first camera 12, 14, 16 enters the tunnel 22 or the region having altered brightness can be established based on this and on the calculated remaining period of time $t_v$. Alternatively, the point in time at which the vehicle enters the tunnel 22 or the region having altered brightness 24, based on a scaling of the region having altered brightness 24 over time, can be performed. The detected region having altered brightness 24 or the tunnel 22 can be scaled within multiple second image data which are recorded successively in time, wherein the second image data are recorded by means of the second vehicle camera 18 from the outer surroundings of the vehicle 1. Based on the result of this scaling over time, the remaining period of time $t_v$ until the at least one first camera 12, 14, 16 will probably enter the region having altered brightness 24 can then be determined.

By means of scaling as well as in general, particularly at slow vehicle speeds at which the transition from bright to dark surroundings or vice versa is not abrupt but rather describes a transitional period of time, the transition of the changed exposure value(s) can be performed as a function, or the transmission of the changed exposure value (s) to the at least one first vehicle camera 12, 14, 16 can be performed as a temporally successive sequence. Consequently, it particularly describes a continual transition.

The system shown at the bottom in FIG. 3 shows the exposure time (y-coordinate) of the at least one first vehicle camera 12, 14, 16 over time (x-coordinate). It can be seen that the exposure time of the at least one first vehicle camera 12, 14, 16 is adapted to the situation in an active manner. On entry into the tunnel 22, which results in a transition into dark surroundings, the exposure time of the at least one first vehicle camera 12, 14, 16 is immediately increased.

The invention claimed is:

1. A method of operating a camera system of a vehicle including first and second cameras, wherein the method comprises the steps:
   a) with the first camera, capturing first image data from lateral, lateral-rear and/or rear surroundings of the vehicle;
   b) with the second camera, capturing second image data from front surroundings of the vehicle;
   c) based on the second image data, in the front surroundings of the vehicle detecting a region having a different brightness relative to a region having an initial brightness between the vehicle and the region having the different brightness;
   d) based on the second image data, determining an adjusted exposure value to compensate for the different brightness relative to the initial brightness;
   e) providing the adjusted exposure value to the first camera; and
   f) as the vehicle moves forward, determining a period of time remaining until the first camera is predicted to enter the region having the different brightness, adjusting an exposure setting of the first camera based on the adjusted exposure value, and commencing when the period of time elapses capturing further first image data with the first camera of which the exposure setting has been adjusted based on the adjusted exposure value even when the further first image data captured by the first camera does not yet depict the region having the different brightness.

2. The method according to claim 1, further comprising obtaining motion data values regarding motion of the vehicle, wherein the determining of the period of time is performed based on the motion data values.

3. The method according to claim 1, wherein the capturing of the second image data comprises capturing plural successive images of the front surroundings, the detecting of the region having the different brightness comprises scaling the region having the different brightness over the plural successive images, and the determining of the period of time is performed based on a result of the scaling.

4. The method according to claim 1, wherein the determining of the adjusted exposure value comprises determining local differences in brightness within the second image data between the region having the different brightness and a remainder of the front surroundings captured in the second image data.

5. The method according to claim 1, wherein the region having the different brightness is a brighter region that is brighter than the region having the initial brightness.

6. A program element that is stored in a non-transitory computer-readable medium and that is configured to cause the method according to claim 1 to be performed when the program element is executed on a processor of the camera system.

7. A non-transitory computer-readable medium, on which is stored a program element that, when executed on a processor of the camera system, causes the method according to claim 1 to be performed.

8. A camera system for a vehicle, comprising:
   a first camera configured to capture first image data from lateral, lateral-rear and/or rear surroundings of the vehicle;
   a second camera configured to capture second image data from front surroundings of the vehicle; and
   a processor arrangement configured:
      to evaluate the second image data to detect, in the front surroundings of the vehicle, a region having a different brightness relative to a region having an initial brightness between the vehicle and the region having the different brightness,
      to determine, based on the second image data, an adjusted exposure value to compensate for the different brightness relative to the initial brightness,
      to provide the adjusted exposure value to the first camera,
      to determine a period of time remaining until the first camera is predicted to enter the region having the different brightness as the vehicle moves forward,
      to cause the first camera to adjust an exposure setting of the first camera based on the adjusted exposure value, and
      to cause the first camera, of which the exposure setting has been adjusted based on the adjusted exposure value, to capture further first image data commencing when the period of time elapses even when the further first image data captured by the first camera does not yet depict the region having the different brightness.

9. The camera system according to claim 8, wherein the first camera is a camera of a camera-based mirror-replacement system of the vehicle.

10. A vehicle comprising a vehicle body and the camera system according to claim 8 mounted on the vehicle body.

* * * * *

UNITED STATES PATENT AND TRADEMARK OFFICE
CERTIFICATE OF CORRECTION

PATENT NO. : 11,039,078 B2
APPLICATION NO. : 16/604369
DATED : June 15, 2021
INVENTOR(S) : Fendt Page 1 of 1

It is certified that error appears in the above-identified patent and that said Letters Patent is hereby corrected as shown below:

On the Title Page

Item (73) Assignee:
Line 1, after "Conti" replace "Ternie" with --Temic--;

Page 2
Item (56), References Cited, U.S. PATENT DOCUMENTS, right column:
Line 31, after "1/2021", replace "Oku ike" with --Okuike--.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*